Fig. 1

INVENTORS
Ludwig Leitz
Gerhard Salzmann

Fig. 2

INVENTORS
Ludwig Leitz
Gerhard Salzmann

Jan. 11, 1966

L. LEITZ ETAL 3,228,289

CAMERA LENS HAVING ESCAPEMENT CONTROL
OF LENS ELEMENTS RELATIVELY MOVABLE
LONGITUDINALLY OF THE OPTICAL AXIS

Filed Aug. 6, 1962

INVENTORS
Ludwig Leitz
Gerhard Salzmann
BY
ATTORNEY

Jan. 11, 1966  L. LEITZ ETAL  3,228,289
CAMERA LENS HAVING ESCAPEMENT CONTROL
OF LENS ELEMENTS RELATIVELY MOVABLE
LONGITUDINALLY OF THE OPTICAL AXIS
Filed Aug. 6, 1962  5 Sheets-Sheet 4

INVENTORS
Ludwig Leitz
Gerhard Salzmann
BY
ATTORNEY

Jan. 11, 1966

L. LEITZ ETAL

3,228,289

CAMERA LENS HAVING ESCAPEMENT CONTROL
OF LENS ELEMENTS RELATIVELY MOVABLE
LONGITUDINALLY OF THE OPTICAL AXIS

Filed Aug. 6, 1962

INVENTORS
Ludwig Leitz
Gerhard Salzmann
BY
ATTORNEY

United States Patent Office 3,228,289
Patented Jan. 11, 1966

3,228,289
CAMERA LENS HAVING ESCAPEMENT CONTROL OF LENS ELEMENTS RELATIVELY MOVABLE LONGITUDINALLY OF THE OPTICAL AXIS
Ludwig Leitz and Gerhard Salzmann, Wetzlar (Lahn), Germany, assignors to Ernst Leitz G.m.b.H. Wetzlar, Wetzlar, Germany
Filed Aug. 6, 1962, Ser. No. 214,948
Claims priority, application Germany, Oct. 12, 1961, L 40,210
15 Claims. (Cl. 88—57)

This invention relates to moving picture and television cameras and, more particularly, to such cameras equipped with varifocal or zoom type lenses. Such lenses are well known and include a rotatable or translatable element, coupled with axially movable optical elements of the lens to effect continuous variation of its equivalent focal length while maintaining the subject in focus or, in other words, to vary the magnification without shifting or altering the image plane of the lens. The effect is, on the one hand, to give the impression of a smooth gradual approach of the camera from a distance to a close-up or telemetric view of the subject or reversely, to begin a shot with a close-up followed by the impression of a smooth gradual receding movement away from the subject.

In some cameras equipped with such lenses it has been necessary for the operator to manually actuate the rotatable or translatable element to give the zoom effect, while simultaneously aiming the camera and operating the shutter release. The difficulties of making an acceptable shot under such circumstances are many, even where a tripod mounting is available, and even greater where an attempt is made to make a zoom shot with the camera supported by hand.

In those devices where the translatable or rotatable element of the lens is connectable for drive by the electric or spring motor of the camera, there is the disadvantage that, in the case of electric motor drives, the resulting mechanism is bulky, complicated and expensive. In the case of spring motors there is the added disadvantage that the energy of the motor may become depleted during the taking of a shot, with consequent inevitably unsatisfactory results. This is particularly troublesome since it is usual to make a trial run of the lens adjusting means before actually releasing the shutter, with the result that the spring motor must be rewound before actual picture-taking begins or, otherwise, the shot may be spoiled.

It is therefore the principal object of this invention to provide a control and operating device for a varifocal lens which overcomes and obviates the aforesaid drawbacks and disadvantages of prior art devices.

More specifically, it is an object to provide a constructionally simplified driving means for the continuous adjustment of varifocal lenses and which is independent of the motor operating the shutter and film of the camera.

Another object is to provide, in a drive of the type mentioned, means by which the rate of motion of the lens-adjusting means may be varied or, otherwise stated, means by which the time required for adjustment between the two limiting positions, that is, wide angle and telephoto, may be varied or altered in a known or predetermined manner.

Still another object is to provide a mechanism as aforesaid wherein two coaxial wheels or discs are connected by a spring and which are rotatable within the same angular range so that the spring provides the actual motive power for the varifocal effect of the lens and may be tensioned prior to each shot by turning one of the wheels or discs and the actual focus width setting means is itself inaccessible to the operator.

Yet another object is to provide a manually releasable locking means operable independently of the means for stressing the drive spring, so that the latter may be stressed at any time prior to taking a shot, and held in such stressed condition until released during the taking of the shot.

Another object is to provide a locking means, as aforesaid, which can be rendered operative at any time during taking of a zoom shot to effect cessation thereof, and subsequently actuated at any time to resume the zoom effect.

A further object is to provide a drive for varifocal lenses, as aforesaid, which is selectively operable to directly connect the spring-stressing element to the movable element of the lens so that the zoom effect may be produced when desired, under direct manual control, independently of the rate mechanism, thus enabling changes in the rate of change of focus during taking of a shot.

A still further object is to produce a drive for the focal-distance and concomitant magnification setting of a varifocal lens, which is relatively simple, compact, versatile in use, readily adapted to any type of varifocal lens, and a general advance in the art.

Other objects and advantages of the invention will be obvious to those skilled in the art, after a study of the following detailed description, in connection with the accompanying drawing.

Figure 1:
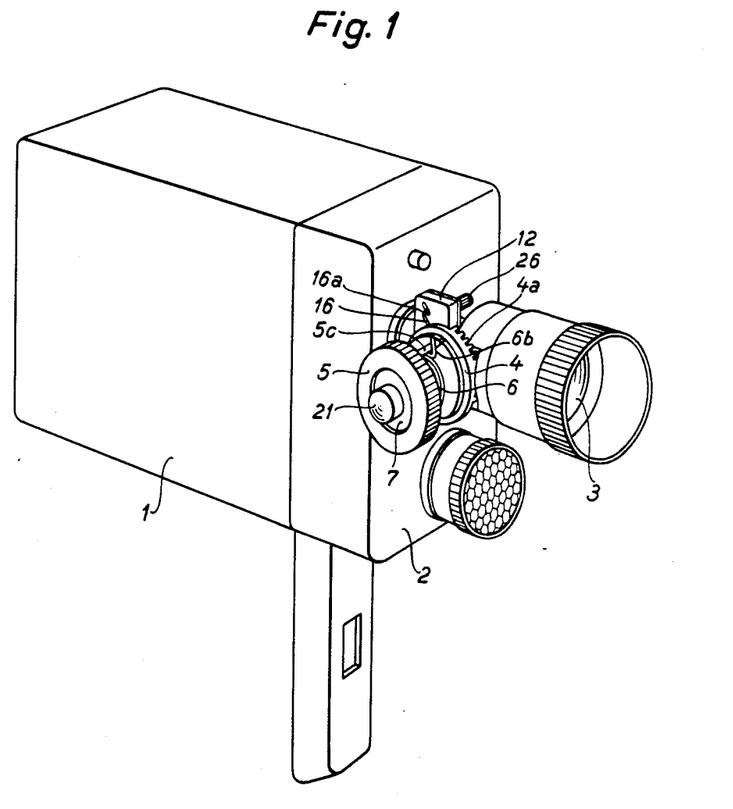
FIGURE 1 is a perspective view showing the invention applied to the varifocal lens of a moving-picture camera.
Figure 2:
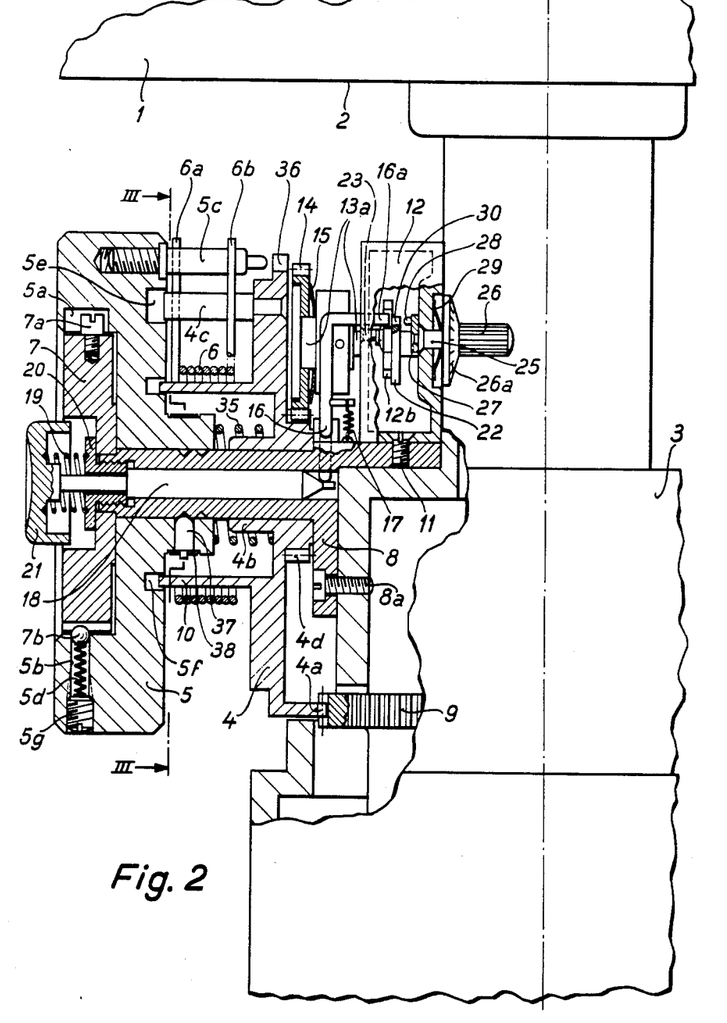
FIGURE 2 is a vertical section, to a scale enlarged over that of FIGURE 1, and taken in a plane through the axis of rotation of the setting knob.

Referring to FIGURES 1 and 2 the case of a moving picture or television camera is identified at 1 having a front 2 mounting a varifocal or zoom lens 3. This lens is of the known type wherein the magnification of the subject may be increased at a uniform rate while at the same time maintaining it in focus. In the particular lens shown the increase in magnification and concomitant change to maintain the focal plane fixed, are effected by rotation of a gear or gear segment 9 about the optical axis of the lens, in a manner known in the art. As seen upon FIGURE 2, the gear segment 9 projects through an opening in the side wall of the lens housing.

A tubular shaft 8 has an integral base secured as by screws 8a to the side wall of the lens housing rearwardly of sector 9 to extend radially of the lens axis. A disc 4 abuts the base of the shaft and has a hub 4b smoothly and rotatably fitting shaft 8. This disc has a crown gear segment 4a the teeth of which mesh with those of segment 9 so that turning of the disc on shaft 8 effects a smooth accurate magnification and focal distance setting of the lens.

Disc 4 is also provided with a cylindrical sleeve 10 which may conveniently be integral therewith and which extends leftwardly therefrom as the parts are viewed upon FIGURE 2 in radially-spaced coaxial relation with shaft 8. A pin 4c, FIGURES 2 and 3, is fixed with disc 4 radially spaced outwardly from sleeve 10.

An actuating knob 5 has a hub journaled for rotation on the distal end of shaft 8. A coil spring 35 fits over and about hub 4b and exerts a thrust axially of shaft 8 urging knob 5 to the left, FIGURE 2. Movement of the knob leftwardly, to the position shown, is limited by a circular stop washer 7 which has a first central aperture fitting over the reduced end of shaft 8 and fixed in the position shown by a bushing 20 having its shank externally threaded to engage an internally threaded counterbore in the distal end of shaft 8. Thus, when turned down, bushing 20 clamps washer 7 in fixed, non-rotational position with respect to the shaft.

As seen upon FIGURE 2, washer 7 has a smooth fit within a counterbore in the outer end of knob 5. Referring also to FIGURE 3, the circumferential wall of this counterbore has a channel 5a therein and which is of limited angular extent, that is, it extends through less than 360°. The actual angle will be determined by the total rotation of disc 4 required to rotate lens element 9 between its minimum and maximum range settings. A screw 7a is secured to the periphery of washer 7 and has its head slidably fitting the aforesaid channel. Thus rotation of knob 5 in either direction is stopped when the head of screw 7a abuts a respective end of the channel.

Figure 3:
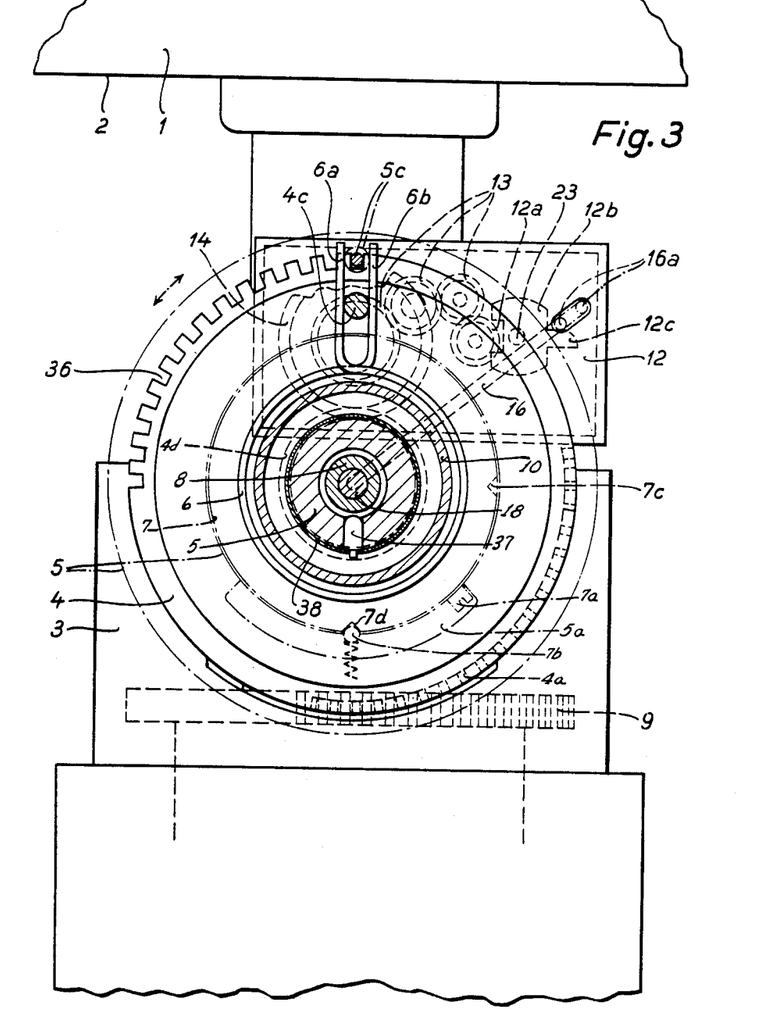
FIGURE 3 is a sectional view to about the same scale as FIGURE 2, taken in a plane identified by the line III—III, FIGURE 2.

As best seen upon FIGURE 3, the periphery of washer 7 is provided with a pair of notches 7c and 7d which are angularly spaced about the axis of shaft 8 by the same angle as is subtended by channel 5. A ball 7b fits a radial hole 5b in knob 5 and is yieldingly urged radially inwardly by a spring 5d. The spring is held in position by an abutment screw 5g threaded into the outer end of hole 5b. The construction and relation of the parts are such that when knob 5 is turned to either of the aforesaid limiting positions as determined by engagement of the head of screw 7a with a corresponding end of channel 5a, ball 7b snaps into a respective one of notches 7c and 7d to thereby releasably hold knob 5 in the adjusted position. It is noted that upon FIGURE 3, for clarity of illustration and to avoid confusion with parts subsequently described, channel 5a is shown displaced 180° from its actual position shown at FIGURE 2, so that in practice there is no interference between the head of screw 7a and spring-pressed ball 7b. As shown upon FIGURE 3, the angular extent of channel 5a, and the angular spacing of notches 7c and 7d may be 90°, although of course, this angle may vary for any given construction, in accordance with the parameters thereof, such as, for example, the ratio of pitch diameters of the teeth of segments 4a and 9, and the maximum angle of rotation of segment 9.

Pin 4c fixed with disc 4 has been mentioned. A second pin 5c is fixed with knob 5. As clearly shown upon FIGURE 3, in one of the aforesaid limiting positions of knob 5, the pins lie in a common plane through the axis of shaft 8.

A coil spring 6 has a loose fit about the sleeve 10 of disc 4. The ends 6a and 6b of this spring are bent radially outwardly so that, in the position of the parts shown upon FIGURES 2 and 3, these ends lie upon respectively opposite sides of and in contact with pins 4c and 5c and thus due to initial tension in spring 6, act to urge the pins into the coplanar relation shown. By means subsequently described, disc 4 is releasably held in position, so that when knob 5 is manually rotated clockwise as viewed upon FIGURE 3, the end 6a of spring 6 is held by abutment with pin 4c while end 6b rotates due to corresponding rotation of pin 5c. Spring 6 is thereby stressed and when knob 5 reaches its other limit of rotation ball 7b snaps into notch 7c and thus retains the spring in its stressed condition wherein it acts to urge pin 4c into follow-up movement, to resume coplanar relation with pin 5c. It is noted from FIGURE 2 that the inner face of knob 5 has formed therein concentric channels 5e and 5f to receive the ends of pin 4c and sleeve 10, respectively, with sufficient clearance so that knob 5 may be moved axially inwardly, that is, to the right as the parts are viewed upon FIGURE 2, for a purpose subsequently explained.

Disc 4 which is rotatably mounted on shaft 8, has a pinion 4d formed on its hub portion. This pinion connects the disc with an escapement carried by and within a housing 12. See FIGURES 1, 2 and 3. This housing is secured to an integral extension of the base of shaft 8, as by screws, one which is shown at 11, FIGURE 2.

Pinion 4d meshes with a pinion 14 rotatable on a shaft 13a which, in turn, is journaled in the walls of housing 12. A spring washer 15 is positioned about shaft 13a, between an enlargement of this shaft and the contiguous face of pinion 14 and thus forms a slip-friction clutch connection between the pinion and shaft so that, normally, the two are connected for rotation as a unit while at times, and under circumstances to be described the pinion may rotate on and relatively to the shaft. The end of shaft 13a within housing 12 carries one of a chain of intermeshing pinions all of which are identified at 13, FIGURE 3. As shown, there are three of these pinions, including the one fixed upon shaft 13a.

Figure 4:
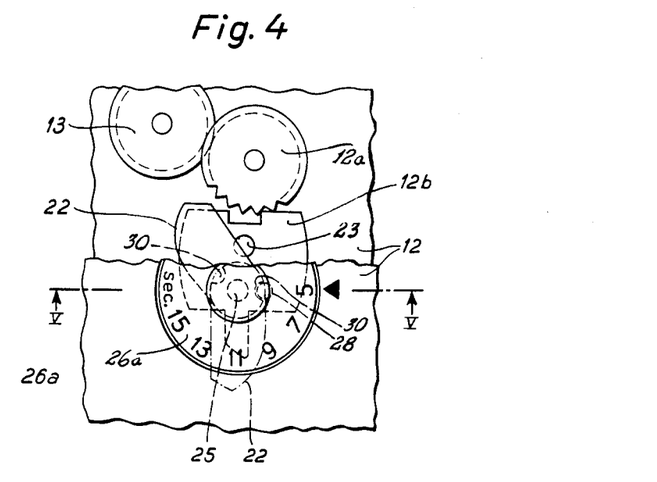
FIGURE 4 is a detail view looking from the right, FIGURE 2, and showing the rate setting mechanism, parts being broken away to disclose underlying structure.

Referring particularly to FIGURE 4, it is noted that the final one of pinions 13 meshes with a pinion 12a of an escapement including a pallet 12b pivoted for oscillation on a shaft 23 fixed in one wall of housing 12. See FIGURE 5. In the manner known in the escapement art, pinion 12a, under urge of tension in spring 6, as previously described, is released tooth by tooth, under control of oscillation of the pallet.

From FIGURES 3 and 4 it is seen that pallet 12b is provided with a radial finger 12c. A rod 16 is mounted radially of shaft 8 and has its inner end projecting through an opening in the shaft to the hollow interior thereof. The other end of rod 16 is bent at right angles so that its tip or stop 16a extends through a slot in the wall of housing 12 to a position adjacent finger 12c. The construction and arrangement are such that when rod 16 is in its radially innermost position, its end or stop 16a lies in the path of oscillation of finger 12c of the pallet to thus prevent oscillation thereof. When the rod is shifted radially outwardly a short distance, it frees the pallet for oscillation.

Shifting of rod 16 between the two aforesaid positions is effected by a pin 18 axially slidable in and along tubular shaft 8. As noted in FIGURE 2, the inner end of the pin is conical. The figure shows the position wherein pallet 12b is held against oscillation. But when pin 18 is shifted to the right, its conical end cams the contacting end of rod 16 and translates the latter radially outwardly to thereby free the pallet for oscillation. A coil spring 17, FIGURE 2, has its ends connected respectively with a stud fixed with rod 16 and the base of shaft 8 to thus constantly urge the rod into the radially inward or escapement-locking position shown.

The outer end of pin 18 is reduced in diameter to form a shoulder which, in cooperation with bushing 20, limits the outward shifting thereof to that shown upon FIGURE 2. A button 21 is fixed to the reduced end of the pin in position to be pressed inwardly against the urge of a coil spring 19 interposed between the button and the bushing. The button is sized for a smooth fit within a counterbore in the outer face of washer 7.

Thus, when button 21 is pressed inwardly, the inner end of pin 18 acts to cam rod 16 radially outwardly against the urge of spring 17 and thus releases pallet 12b so that the disc 4 may rotate under urge of spring 6 and at a rate controlled by the escapement.

This rate may be varied by varying the moment of inertia of the pallet. For this purpose I provide a weight 22 which, as best shown upon FIGURES 4 and 5, has one end pivoted to the pallet on an axis paralleled with but offset from the axis of oscillation 23 of the pallet. The pivotal connection is preferably effected by a rivet 22a on which additionally a dished spring washer 22b is mounted, to keep weight 22 in contact with pallet 12b. Thus, normally, the pallet and weight oscillate as a unit, but the weight may be pivoted relatively to the pallet to vary the moment of inertia of their combined masses about the axis of shaft 23 and, correspondingly, the period of oscillation thereof.

Adjustment or pivoting of weight 22 on and relatively to pallet 12b, to thus vary the period of oscillation of the escapement is effected by mechanism best shown at FIGURES 1, 2, 4 and 5, including a shaft 25 journaled in the outer wall of housing 12 and having a graduated dial 26a and a finger piece 26 integrally connected therewith. The aforesaid housing wall has a circular recess to receive dial 26a when the assembly is pushed in against the urge of a dished spring 29.

The end of shaft 25 within housing 12 has a lever 27 fixed thereto. This lever carries a lug or crank 28 at its distal end. Normally, that is, when pallet 12b is held against oscillation by rod 16, the pivot axis of weight 22 on and relatively to the pallet, i.e. the axis of rivet 22a, is aligned with the axis of shaft 25, as shown upon FIGURES 4 and 5. In this position only, lug 28 is located to enter a notch 30 in the periphery of the weight, when the assembly comprising dial 26a, finger piece 26, shaft 25, lever 27 and lug 28 are translated axially inwardly against the urge of spring 29.

Figure 5:
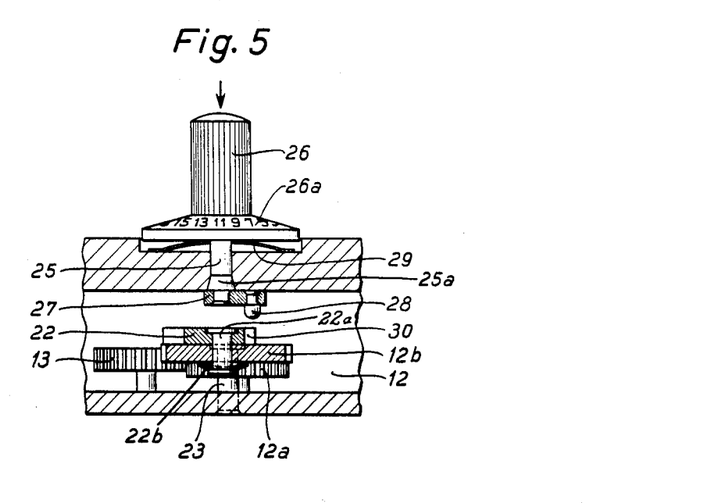
FIGURE 5 is a sectional detail view corresponding to, and taken in a plane identified by line V—V, FIGURE 4.

Thus when the escapement is locked by rod 16, by pressing inwardly on and turning of finger piece 26, weight 22 may be pivoted on and relatively to pallet 12b and the period of oscillation of the escapement correspondingly varied. From the preceding description it will be clear that the variation in the period of oscillation of pallet 12b and weight 22, considered as a unit, is due to the change in radial distance of the centroid of the weight from the axis of oscillation, that is, the axis of shaft 23, in response to angular adjustment of the weight on and relatively to the pallet. Since the axis of adjustment of the weight, that is, the axis of rivet 22a, is offset from shaft 23, it is clear that rotational adjustment of weight 22, as previously described, varies the radius of gyration of the combined pallet and weight about the axis of shaft 23 and hence the movement of inertia, in accordance with the well-know equation $I=mk^2$. Dial 26a may be graduated empirically or directly in seconds required for the adjustment of lens sector 9 throughout its full range. By "full range" is meant the adjustment for any given varifocal lens throughout its full range of magnification, that is, for example, from maximum wide-angle to maximum telephoto settings. It will be noted that pivotal adjustment of weight 22 is possible only when pallet 12b is locked by rod 16, as described, since only in the locked position is the axis of rivet 22a coaxial with that of shaft 25.

Referring to FIGURE 2, the axial adjustment of knob 5 from the leftwardmost position there shown, axially along shaft 8, has been described.

The distal end of pin 5c is reduced in diameter to enter a notch or aperture 36 in the periphery of disc 4 when the knob is axially translated to the right. Under this condition of adjustment, knob 5 and disc 4 are interconnected for rotation as a unit, so that direct manual actuation of lens segment 9 is then possible. When such adjustment is being effected, it is not necessary to release pallet 12b by pushing inwardly on button 21, since, because of the clutch member 15 previously described, pinion 14 may rotate upon its shaft 13a without affecting the pallet or the gear chain by which it is otherwise driven from pinion 14.

In order to hold knob 5 in either of its limiting positions of axial adjustment, its hub is drilled radially to receive a detent 37. This detent is urged radially inwardly by a split cylindrical leaf spring 38, FIGURES 2 and 3, which has a smooth fit within a shallow channel formed externally in and about the hub of the knob. The reduced outer end of the detent fits a hole in the spring, as clearly shown upon FIGURE 2. From FIGURE 3 it is seen that the spring 38 is split at a point diametrically opposite detent 37. The radially inward end of the detent enters a respective one of a pair of circular grooves formed in shaft 8, to thereby yieldingly hold the knob in either limiting position of axial adjustment. Channel 5a is of sufficient width to permit the aforesaid axial adjustment of the knob without interference from screw 7a. Likewise channels 5e and 5f are made sufficiently deep to enable the required adjustment of the knob to the right, FIGURE 2.

In operation, where escapement control of disc 4 is to be effected, finger piece 26 is first pushed in to engage lug 28 in notch 30 of weight 22, and turned until the selected graduation upon dial 26a registers with an index, not shown, fixed with the contiguous wall of housing 12. The adjustment will determine, of course, the elapsed time desired for rotation of lens segment 9 between maximum wide-angle and full telephoto positions.

The knob 5 may be rotated at any time before exposure begins, counterclockwise from the position shown upon FIGURE 3, wherein detent ball 7b is in notch 7d, to a position wherein it is in notch 7c. These positions are readily determined by feel as well as audibly when the ball snaps into either notch. Turning of the knob beyond either position is prevented by engagement of screw 7a with the corresponding end of channel 5a. When the knob is thus turned, end 6a of spring 6 is correspondingly turned and since end 6b is held by engagement against pin 4c of disc 4, the spring is correspondingly and additionally stressed to urge pin 4c and disc 4 into follow-up rotation.

Pressing in of button 21 at the beginning of, or at any time during the taking of a shot, cams rod 16 radially outwardly by action of the conical end of pin 18. The end 16a of the rod is thus moved to free finger 12c of pallet 12b and the latter begins to oscillate under urge from spring 6, disc 4, pinions 4d, 14, clutch 15, and gears 13. The rate of movement of disc 4 is that determined by the previous setting of weight 22 relatively to pallet 12b. At the same time, turning of disc 4 operates through its segment 4a to turn lens segment 9 and thus increase the magnification of the lens to give the desired zoom or gradually increasing telephoto effect. Rotation of disc 4 may be stopped at any time during taking of a shot merely by release of pressure upon button 21 and, in any event, is stopped when pin 4c moves into contact with end 6a of spring 6. Likewise the zoom effect may be resumed as desired.

After disc 4 has reached its position in which end 6a of spring 6 contacts pin 4c spring 6 may easily be tensioned again by merely turning knob 5 in a direction opposite to the direction it had been turned prior to the previous exposure. In this position detent ball 7b is back in notch 7d as shown upon FIGURE 3, but spring 6 is then tensioned, urging disc 4 into a follow-up movement in a direction opposite to its previous movement. Thus by turning knob 5 first in one direction to its limiting position and then in opposite direction to its limiting position and so forth and by pressing button 21 after each rotation the focus length of the lens will be changed alternately from extreme telephoto to extreme wide-angle setting and back again to telephoto.

However, it is not necessary for disc 4 always to complete this circle. Had it, for instance, been stopped halfway in its follow-up movement by release of pressure on button 21 during taking of a shot as described before and should it then be desirable to reverse the zoom effect this can readily be accomplished by turning knob 5 to its other end position and then again pressing button 21. Disc 4 will then also move in opposite direction though it had not yet completed its former turn, and as a result the sense of the objectives focal length change will be reversed.

In spite of the varifocal lens being provided with motor drive it may under certain conditions still be advisable to switch off the motor drive and to manually actuate the element causing the zoom effect. This is especially the case if a situation calls for a shot with zoom effect at different rates of change of focus. Since the motor drive during one shot is bound to one specific rate of focus change chosen prior to the shot by way of setting graduated dial 26a, a change in the rate of focus change during the exposure can only be accomplished by hand actuation of the zoom member, i.e. disc 4.

In the present invention an operation as aforesaid can easily be performed by pressing in on knob 5 to engage the end of pin 5c within notch 36 in disc 4. Thus spring 6 is temporarily rendered ineffective and knob 5 and disc 4 may then be turned as a unit at any speed momentarily desired. During this operation, pinion 14 idles on its shaft 13a without effect upon the remaining gears leading to the escapement.

Figure 6:
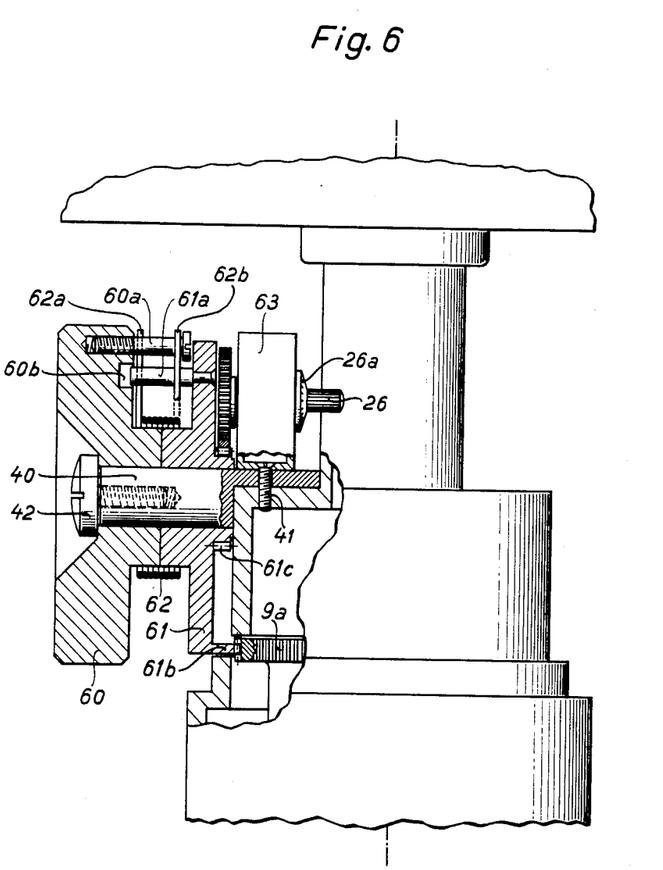
FIGURE 6 is a sectional view corresponding generally to FIGURE 2 but showing a modified form of the invention.

At FIGURE 6 there is shown a modification wherein the means for releasably locking and retaining the manually-actuable spring-stressing knob 5 is omitted.

In this modification, the lens gear segment 9 may be the same as in the species of FIGURES 1 to 5 and therefore has been identified by the same reference numeral. Likewise the rate or escapement mechanism within housing 63 may be the same as that depicted upon FIGURES 1 to 5.

A shaft 40 is fixed, as by screws one of which is identified at 41 to the lens casing in essentially the same position as shaft 8, FIGURE 2. A disc 61 corresponding generally in function to disc 4, is journaled on shaft 40 and is provided with crown gear segment 61b in mesh with the teeth of segment 9. The disc also has pinion 61c integral with its hub, and which meshes with pinion 14 directly connected with the rate or escapement mechanism in casing 63. It is to be noted that friction spring or clutch 15 is omitted in the species of FIGURE 6 so that there is a positive drive from gear 14 to the pallet of the rate mechanism within the casing. Disc 61 is also provided with pin 61a fixed thereto and having its distal end projecting into a circular channel 60b in knob 60.

Knob 60 is also journaled upon shaft 40 and is held thereon by cap screw 42 threaded into an axial hole in the shaft. The knob carries a pin 60a threaded thereto in position radially outward of and parallel with pin 61a and the axis of shaft 40. In the positions shown the pins are coplanar in a plane through the axis of the shaft.

The two meeting hub portions of knob 60 and disc 61 are of the same diameter and conjointly define a spool about which a coil spring 62 extends. The spring is formed with radial ends 62a and 62b to lie upon respectively opposite sides of the pins and thereby urge them into the coplanar relation shown.

Since the escapement mechanism in casing 63 may, except for the omission of clutch spring 15 and locking parts 16, 18, etc., be identical with that disclosed in connection with FIGURES 1 to 5, it is sufficient to identify finger piece 26 and dial 26a.

The operation of the modified form shown at FIGURE 6 is basically like that previously described, except that disc 61 and segment 9 begin to turn, under control of the rate mechanism in casing 63 as soon as knob 60 is manually turned. However, turning of the knob at a relatively rapid rate does not effect a corresponding rate of movement of lens segment 9 as the latter rate remains under control of the escapement in casing 63. On the other hand, turning of knob 60 at relatively slow rates effects a corresponding smoothed rate of operation of the lens segment 9 and the zoom effect created thereby.

Various modifications, substitutions of equivalents and variations will occur to those skileld in the art, after a study of the foregoing disclosure, which should therefore be taken in an illustrative rather than a limiting sense.

All such modifications within the scope of the subjoined claims are reserved. While there has been shown a varifocal lens wherein the zoom effect is created by rotating an element such as lens segment 9, about the optical axis of the lens, it will be understood that the invention is readily adaptable to a lens having a part translatable along the axis of the lens or rotatable about an axis offset therefrom, to give the zoom effect. Such adaptation involves merely the interposition between disc 61 and such part, of suitable mechanical means for effecting the required translation. For example, disc 61 might have radial teeth in substitution for crown teeth 61b, properly arranged and constructed to mesh with the teeth of a rack integrally connected with a lens adjustment means translatable along, parallel with, and offset from the optical axis of the lens. In fact, by the provision of known mechanical means, angular motion of disc 4 may be converted into any form of motion required, depending upon the particular varifocal lens used.

We claim:

1. In combination with a camera lens of the varifocal type having an element movable to give a zoom effect, a shaft fixed with said lens, a disc and a knob both journaled on said shaft for independent relative rotation thereon, spring means yieldingly connecting said disc and knob whereby turning of said knob urges said disc into follow-up rotation, a drive connecting said disc and element for synchronous movement, an escapement connected with said disc to control the rate of motion of said element under urge of said spring means, control means for said escapement and mounted for movement axially within and along said shaft, for movement between first and second positions, and means operated by said control means and effective in said first position thereof, to stop said escapement and arrest rotation of said disc, and in said second position to free said escapement for effecting rotation of said disc under control of said escapement.

2. In a mechanical drive for the movable zoom element of a varifocal camera lens, a disc, a manually operable knob, means mounting said disc and knob for independent rotation on a common axis fixed with said lens, a driving connection between said element and disc, an escapement rate-control device, a driving connection between said device and said disc, spring means yieldingly connecting said disc and knob and stressed by rotation of said knob to urge said disc into follow-up rotation under control of said device, and means releasably securing said knob in a position of rotation stressing said spring.

3. In a drive for the movable zoom element of a varifocal lens, a shaft, a disc and a knob mounted coaxially on said shaft in contiguous relation for independent rotation, a driving connection between said disc and zoom element to move the latter in response to rotation of said disc, spring means interconnecting said disc and knob and stressable by and in response to rotation of said knob, to effect follow-up rotation of said disc, and an escapement rate-control device connected with said disc to control the rate of rotation thereof under urge of said spring means.

4. The mechanism of claim 3, and means releasably holding said knob in each of two limiting rotational positions, said positions corresponding to maximum wide-angle and maximum telephoto positions of said element.

5. In a varifocal camera lens having a casing and an element movable to adjust said lens between wide-angle and telephoto positions to provide a zoom effect, a shaft fixed with said casing, a disc and a knob both journaled on said shaft for coaxial independent rotation thereon, a first driving connection between said disc and element, a pinion fixed with said disc coaxially of said shaft, and escapement, a second driving connection between said pinion and said escapement, and including a slip-friction clutch, a pair of pins each fixed with a respective one of said disc and knob and parallel with and radially offset from said shaft, a coil spring interposed between said disc and knob coaxially about said shaft, said spring having a first end extending radially of said shaft and engageable with both said pins on one side thereof, said spring having a second end extending radially of said shaft and engageable with both said pins on the other side thereof, rotation of said knob stressing said spring to thereby urge said disc into movement following up said knob.

6. A device as recited in claim 5, a washer fixed with said shaft adjacent said knob, cooperating means between said knob and washer to releasably secure said knob in each of two limiting positions of rotational adjustment, said knob being translatable axially of said shaft between first and second positions, means responsive to translation of said knob to second position to connect said knob and disc for rotation as a unit, and means urging said knob into first position.

7. In a drive for actuating the focus-varying element of a varifocal camera lens including a casing, a tubular shaft fixed with said casing, a disc and a knob journaled on said shaft for independent rotation, a first driving connection between said disc and element, an escapement carried by said casing, a second driving connection between said disc and escapement and including a slip-friction clutch, a rod mounted radially of said shaft and having a first end terminating on the axis thereof, a stop fixed with the second end of said rod, said rod being shiftable radially of said shaft, from a first position wherein said stop engages and prevents operation of said escapement, to a second position wherein said stop is free and clear of said escapement, means yieldingly urging said rod into first position, a pin slidably fitting said tubular shaft and in contact at its one end with the first end of said rod, cam means between the contacting ends of said pin and rod to move the latter to second position by and in response to shifting of said pin axially of said shaft, means for manually shifting said pin to move said rod to second position, and a yielding spring driving connection between said knob and disc.

8. The drive as in claim 7, said knob being shiftable axially on said shaft from a first position to a second position toward said disc, a first pin fixed with said knob and extending toward said disc, a second pin fixed with said disc and extending toward said knob, said pins being parallel with and radially offset from said shaft, said pins being coplanar in a plane through the axis of said shaft for one position of relative rotations of said knob and disc, a coil spring extending coaxially about said shaft between said knob and said disc and having a first and second radial ends contacting said pins on respectively opposite sides thereof when said knob and disc are in said one position, whereby rotation of said knob in first position, stresses said spring to urge said disc into rotation following up said knob, axial shifting of said knob to second position causing said first pin to enter an aperture in said disc to positively connect said knob and disc for rotation as a unit.

9. The drive as in claim 8, spring means urging said knob into first position, and detent means between said shaft and knob and releasably holding said knob in either of its said positions.

10. The drive as in claim 7, said knob having a recess in one face coaxial of said shaft, a washer within said recess and fixed with said shaft, cooperating stop means between said washer and knob and limiting the latter to rotation between first and second positions, the parts being constructed, proportioned and arranged such that said limiting positions of said knob correspond to respective limiting positions of said lens element.

11. A varifocal camera lens comprising, a casing, an element carried by said casing and movable to adjust said lens between wide-angle and telephoto positions to provide a zoom effect, a tubular shaft fixed with said casing, a disc and a knob both journaled on said shaft for coaxial independent rotation thereon, a first driving connection between said disc and element, a pinion fixed with said disc coaxially of said shaft, an escapement, a second driving connection between said pinion and said escapement and including a slip-friction clutch, a pair of pins each fixed with a respective one of said disc and knob and radially offset from said shaft, a coil spring encircling said shaft between said disc and knob and having end portions extending radially of said shaft, one said end portion engageable with both said pins, on one side thereof, the other end portion being engageable with both said pins on the other side thereof, rotation of said knob rotating its pin to stress said spring and urge said disc into follow-up rotation, a washer fixed to the distal end of said shaft, cooperating means between said knob and washer to releasably secure said knob in each of two limiting positions of rotational adjustment about and with respect to said shaft, said knob being manually translatable axially along said shaft between first and second positions, means yieldingly holding said knob in either of said first and second positions, means responsive to translation of said knob to said second position to positively connect said knob and disc for rotation as a unit, spring means urging said knob into its said first position, a pin mounted for translation in and along said shaft, a manually pressable button on the distal end of said pin, adjacent said knob, means urging said pin to a limiting position outwardly along said shaft, a stop movable to obstruct or free said escapement, spring means urging said stop into obstructing position, and means operated by axial movement of said pin inwardly in and along said shaft to move said stop to escapement-freeing position.

12. The combination with a camera lens having lens elements relatively movable longitudinally of the optical axis to give a zoom effect, of motor means, first means connecting said motor means with said lens elements to move the same, rate-control means connected with said first means to control the rate of movement thereof under urge of said motor means, means manually actuable to energize said motor means, said rate-control means being an escapement and adjustable to vary the rate of movement of said first means, and means manually operable to so adjust said rate-control means.

13. In a varifocal camera lens having a casing and an element movable relatively to said casing between a first limiting wide-angle position and a second limiting telephoto position to give a zoom effect, a shaft fixed with said casing externally thereof, a disc and a knob journaled on said shaft for independent rotation, a driving connection between said disc and element, a first pin fixed with said disc and extending toward said knob, a second pin fixed with said knob and extending toward said disc, said pins being parallel with said shaft, radially offset therefrom, and in one position of relative adjustment of said disc and knob, lying in a common plane through the axis of said shaft, a coil spring between said disc and knob and extending about said shaft coaxially therewith, said spring having first and second ends radially of said shaft and, when said disc and knob are in said one position, contacting said pins at respectively opposite sides thereof to yieldingly urge said disc and knob into said one position, a rate-control device, a driving connection between said rate-control device and said disc, said rate-control device comprising an escapement including a pallet oscillatable about a first axis, a weight pivoted to said pallet on a second axis parallel with and offset from said first axis, rotation of said weight about said second axis relatively to said pallet, shifting the centroid of said weight radially of said first axis.

14. A varifocal lens as in claim 13, said rate-control device comprising an escapement including a pallet oscillatable about a first axis, a weight pivoted to said pallet on a second axis parallel with and offset from said first axis, rotation of said weight about said second axis relatively to said pallet, shifting the centroid of said weight radially of said first axis, there being an aperture in said weight radially offset from said second axis, a second shaft journaled adjacent said pallet for rotation on an axis coincident with said second axis when said pallet is in one position of oscillation only, said second shaft being axially shiftable toward said weight, lever means fixed with said second shaft and having a lug radially offset therefrom to engage in the aperture of said weight when said pallet is in said one position, a fingerpiece fixed with said second shaft for shifting and turning the same, and means frictionally connecting said pallet and weight for oscillation as a unit.

15. A drive for the movable zoom element of a varifocal camera lens having a casing, a shaft fixed with said casing externally thereof, a disc and a knob journaled on said shaft for independent rotation, said disc and knob having hub portions of equal diameter and in end to end contact to define a circular channel between them, first and second pins each fixed with a respective one of said disc and knob parallel with and radially offset from said shaft, a coil spring surrounding said hub portions and lying in said channel, said spring having one radial end adapted to contact both said pins at one side thereof, said spring having its other radial end adapted to contact both said pins at the other side thereof, whereby rotation of said knob stresses said spring to urge said disc into follow-up rotation of said knob, a rate-control mechanism carried by said casing, a driving connection between said rate-control mechanism and said disc, said rate-control mechanism comprising an escapement including a pallet having a variable moment of inertia, and manually operable means carried by said casing for engaging and setting said pallet to vary the moment of inertia thereof and the corresponding rate of rotation of said disc under urge of said spring.

References Cited by the Examiner

UNITED STATES PATENTS

| | | | |
|---|---|---|---|
| 2,037,360 | 4/1936 | Barenyi | 58—116 X |
| 2,081,727 | 5/1937 | Barenyi | 58—116 XR |
| 2,464,316 | 3/1949 | Jeanneret | 158—38 X |
| 2,705,908 | 4/1955 | Walker | 95—45 |
| 2,995,061 | 8/1961 | Briskin et al. | 88—57 |
| 3,106,125 | 10/1963 | Martin et al. | 88—57 |

JEWELL H. PEDERSEN, *Primary Examiner.*

J. K. CORBIN, *Assistant Examiner.*